Sept. 30, 1941.　　　　A. A. WEBB　　　　2,257,557
STEERING KNUCKLE SUPPORT ARM
Filed Jan. 27, 1941
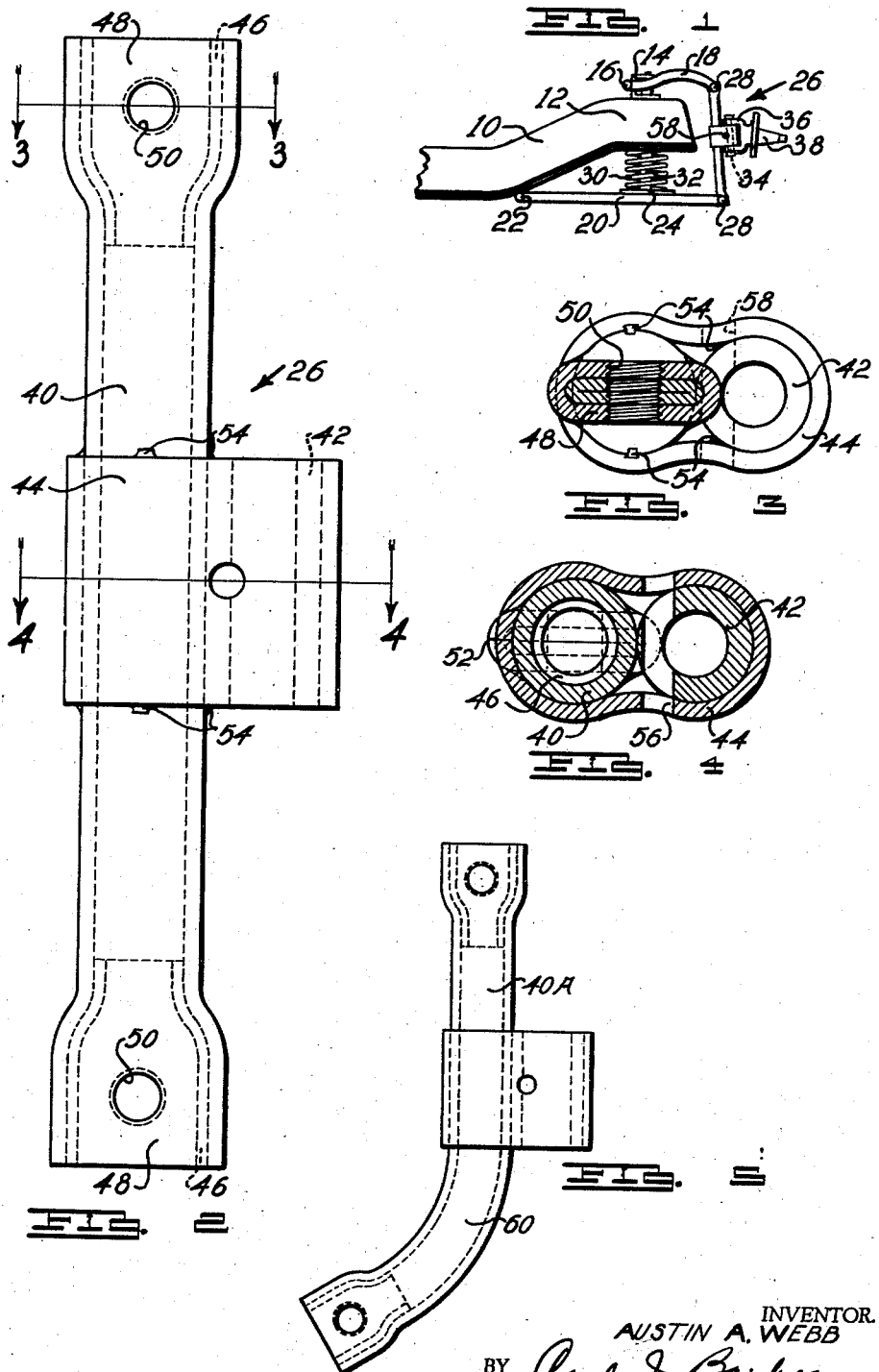
INVENTOR.
AUSTIN A. WEBB
BY Carl J. Barbee
his ATTORNEY.

Patented Sept. 30, 1941

2,257,557

UNITED STATES PATENT OFFICE 2,257,557

STEERING KNUCKLE SUPPORT ARM

Austin A. Webb, Kenosha, Wis., assignor to Nash-Kelvinator Corporation, Kenosha, Wis., a corporation of Maryland Application January 27, 1941, Serial No. 376,133

10 Claims. (Cl. 280—96.1)

This invention relates to automotive wheel suspensions and has particular reference to the steering knuckle support arm of a parallel arm type of wheel suspension.

It is an object of this invention to provide a support arm which is lighter than arms known heretofore.

It is another object of this invention to provide a support arm which will be less expensive to manufacture than support arms known heretofore.

It is another object of this invention to provide a support arm which may be manufactured out of stampings and tubular stock.

Other objects and advantages of this invention will be apparent from a consideration of the following description and claims and the attached drawing, of which there is one sheet, and in which—

Figure 1 represents a front elevation of a parallel arm type of automotive wheel suspension;

Figure 2 represents an enlarged detailed view of the steering knuckle support arm illustrated in Figure 1;

Figure 3 represents a sectional view taken along a plane indicated by the line 3—3 in Figure 2 and looking in the direction of the arrows;

Figure 4 represents a sectional view taken along a plane indicated by the line 4—4 in Figure 2 and looking in the direction of the arrows; and Figure 5 represents a front elevation of a modified type of steering knuckle support arm.

Figure 1 illustrates one end of the front cross member 10 of an automobile frame. The cross member is provided with a raised end portion 12 on top of which is secured a bracket 14. The bracket 14 serves as a support for a pivot bar 16 upon which the upper control arm 18 is rotatably secured. A lower control arm 20 is pivoted to the underside of the cross member 10 at 22 and is provided with a lower spring seat 24. A steering knuckle support arm generally indicated at 26 has its ends pivotally secured to the outer ends of the control arms 18 and 20 by the pivot pins 28. A coil spring 30 and strut type shock absorber 32 are positioned between the lower spring seat 24 and the raised portion 12 of the cross member 10. The support arm 26 is arranged to support a king pin 34 in a manner which will be more particularly described later. The king pin 34 rotatably supports the steering knuckle 36 on which is formed a wheel spindle 38 of any suitable design.

The steering knuckle support arm 26 consists of a tubular strut 40 and a sleeve 42 which is secured to the side of the strut 40 by a collar 44. The ends of the strut 40 are reinforced by short filler tubes 46 which are secured in the ends of the strut as by being press fitted therein. After the filler tubes 46 have been pressed into the ends of the strut 40, the ends of the strut and the filler tubes are pressed flat as at 48 so as to form a solid section of metal (note the sectional view, Figure 3).

The solid ends 48 are pierced and tapped as at 50 to receive the threaded center portion of the pivot pins 28. It will be noted that the sides of the stamped ends 48 are parallel to each other so that they may be received in the ends of the upper and lower control arms in the same fashion as are solid, forged support arms.

The sleeve 42 is secured to the side of the tubular strut 40 by bending or pressing the collar 44 around the sleeve 42 and the tubular midsection of the support arm 26. The ends of the collar 44 may be brought into abutting relationship on the inside edge of the support arm and welded as at 52 (see Figure 4). The connections between the sleeve 42, collar 44 and the tubular strut 40 may be further strengthened by welding as at 54 (see Figures 2 and 3). Attention is called to the fact that the height of the collar 44 is the same as the length of the sleeve 42. In this manner, the edges of the collar cooperate with the ends of the sleeve to form horizontal surfaces on which the vertical loads of the steering knuckle 36 are carried.

The sleeve 42 and collar 44 are provided with an aperture 56 which extends at right angles to the axis of the sleeve 42 and intersects the inner wall of the sleeve 42. The aperture 56 is arranged to receive a locking pin 58 (see Figure 1), which pin will secure the king pin 34 against rotative and axial movement within the sleeve 42. The steering knuckle 36 may be secured on the ends of the king pin 34 in any suitable manner.

The support arm illustrated in Figure 5 is the same in all respects as that illustrated in Figures 1 through 4 except that the tubular member 40A in Figure 5 is provided with a bend at 60 so that the support arm may be attached to a lower control arm which is shorter than the one illustrated in Figure 1 should it be found desirable to use such a control arm.

From the above description, it should be apparent that the support arm will be lighter than the usual forged type of support arm due to its hollow tubular construction and will be cheaper to construct since the stamping of the ends of the tubular strut 40 and the attaching of the sleeve 42 eliminates the necessity for heating a solid block of metal for forging, as is the case in other support arms. The sleeve 42 which supports the king pin 34 may be separately machined before assembly to the strut 40, thus making it unnecessary to perform a machining operation on the completed support arm.

While I have described my invention in some detail, I intend this description to be an example only and not as a limitation of my invention, to which I make the following claims:

1. In an automotive wheel suspension, a steering knuckle support arm comprising a hollow tubular strut having its ends stamped flat and pierced, and a tubular sleeve secured to the midsection of said tubular strut, the axis of said sleeve being offset from the axis of said strut.

2. In an automotive wheel suspension, a steering kunckle support arm comprising a tubular strut having its ends stamped flat, a cylindrical sleeve positioned adjacent to the midsection of said tubular strut, and a collar wrapped around said sleeve and the midsection of said strut.

3. In an automotive wheel suspension, a steering knuckle support arm comprising a tubular strut, filler tubes positioned in each end of said strut, the ends of said strut and said filler tubes being pressed flat, a sleeve positioned against the midsection of said tubular strut, and a collar wrapped around said sleeve and the midsection of said strut to hold said sleeve in position, said collar being welded to said strut.

4. In an automotive wheel suspension, a steering knuckle support arm comprising a tubular strut having its ends stamped flat, a sleeve defining a cylindrical aperture positioned adjacent to the midportion of said tubular strut with the axis of said tubular aperture parallel to the axis of said strut, a collar wrapped around said sleeve and said strut to hold said sleeve in place, a king pin positioned in said sleeve, said sleeve and said collar defining a second aperture intersecting the cylindrical aperture in said sleeve at right angles thereto, and a locking pin positioned in said second aperture to secure said king pin relative to said sleeve.

5. In an automotive wheel suspension of the parallel arm type, a support arm comprising a tubular strut having its ends stamped flat, a sleeve defining a cylindrical aperture positioned adjacent to the midsection of said tubular stock, and a collar wrapped around said sleeve and the midsection of said strut, said collar having the same width as the length of said sleeve.

6. In an automotive wheel suspension of the parallel arm type, a support arm comprising a tubular strut having its ends stamped flat, a sleeve defining a cylindrical opening positioned adjacent to the midsection of said tubular strut, and a collar wrapped around said sleeve and the midsection of said strut, the ends of said collar being secured together to form a continuous band around said sleeve and said strut.

7. In an automotive wheel suspension of the parallel arm type, a support arm comprising a tubular strut having its ends stamped flat and defining apertures, a king pin supporting member positioned adjacent to the midsection of said strut, and a collar wrapped around said king pin supporting member and said strut to hold said member in position.

8. In an automotive wheel suspension of the parallel arm type, a support arm comprising a tubular member having its ends stamped flat and defining apertures, a king pin supporting member positioned adjacent to an intermediate portion of said strut, and a collar wrapped around said king pin supporting member and said strut to hold said parts together, said strut being bent to lie along more than one line.

9. In an automotive wheel suspension, a steering knuckle support arm comprising a tubular strut having its ends stamped flat, a cylindrical sleeve positioned adjacent to said strut intermediate the ends of said strut, and a collar wrapped around said sleeve and said strut.

10. In an automotive wheel suspension, a steering knuckle arm comprising a tubular strut, filler tubes positioned in each end of said strut, the ends of said strut and said filler tubes being pressed flat, a sleeve positioned against said strut intermediate the ends thereof, and a collar wrapped around said sleeve and said strut to hold said sleeve in position, said collar being welded to said strut.

AUSTIN A. WEBB.